(12) United States Patent
Tomaru et al.

(10) Patent No.: US 11,275,445 B2
(45) Date of Patent: Mar. 15, 2022

(54) INPUT DEVICE

(71) Applicant: DENSO CORPORATION, Kariya (JP)

(72) Inventors: Tetsuya Tomaru, Kariya (JP); Tatsuya Yamaguchi, Kobe (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/092,914

(22) Filed: Nov. 9, 2020

(65) Prior Publication Data
US 2021/0055798 A1 Feb. 25, 2021

Related U.S. Application Data

(63) Continuation of application No. PCT/JP2019/016252, filed on Apr. 16, 2019.

(30) Foreign Application Priority Data

May 16, 2018 (JP) .............................. JP2018-094606

(51) Int. Cl.
*G06F 3/048* (2013.01)
*G06F 3/01* (2006.01)
(Continued)

(52) U.S. Cl.
CPC .......... *G06F 3/016* (2013.01); *G06F 3/03547* (2013.01); *G06F 3/0488* (2013.01); *G06F 2203/014* (2013.01)

(58) Field of Classification Search
CPC ........ G06F 3/016; G06F 3/0414; G06F 3/041; G06F 2203/04104; G06F 3/0428; G06F 3/0488; G06F 2203/014
See application file for complete search history.

(56) References Cited

U.S. PATENT DOCUMENTS

2008/0296072 A1\* 12/2008 Takashima .............. G06F 3/016
178/18.01
2009/0244017 A1\* 10/2009 Pala ....................... B60K 35/00
345/173
(Continued)

FOREIGN PATENT DOCUMENTS

JP 2017130021 A 7/2017

OTHER PUBLICATIONS

Feng et al., Green Vehicle Shock Absorber: Micromachined Wavy Shaped Piezoelectric Cushion Energy Harvester and Its Power Generating Demonstration Based on Real Navigation; © 2011 IEEE; 4 pages.\*

*Primary Examiner* — Linh K Pham
(74) *Attorney, Agent, or Firm* — Harness, Dickey & Pierce, P.L.C.

(57) ABSTRACT

An input device includes: a detector configured to detect an operation state of an operation body on an operation surface; a controller configured to execute an input control with respect to a predetermined instrument in accordance with the operation state of the operation body; and a drive portion configured to vibrate the operation surface. A selection position of the operation buttons on a display is correlated to a coordinate position of the operation body on the operation surface. The drive portion generates a predetermined vibration on the operation surface for a predetermined period in response to determining that the selection position of the operation buttons on the display is changed from one operation button to another operation button.

8 Claims, 12 Drawing Sheets

(51) Int. Cl.
*G06F 3/0354* (2013.01)
*G06F 3/0488* (2022.01)

(56) References Cited

U.S. PATENT DOCUMENTS

| | | | | |
|---|---|---|---|---|
| 2011/0040455 | A1* | 2/2011 | Lathrop | B60K 35/00 |
| | | | | 701/48 |
| 2012/0327006 | A1* | 12/2012 | Israr | G06F 3/016 |
| | | | | 345/173 |
| 2015/0097793 | A1* | 4/2015 | Lisseman | G06F 3/0414 |
| | | | | 345/173 |
| 2015/0162772 | A1* | 6/2015 | Peterson | H01M 4/368 |
| | | | | 320/135 |
| 2018/0088770 | A1* | 3/2018 | Brombach | G06F 3/0488 |

* cited by examiner

1ST SETTING EXAMPLE OF FRICTIONAL FORCE

FIG. 13B

2ND SETTING EXAMPLE OF FRICTIONAL FORCE

FIG. 13C

3RD SETTING EXAMPLE OF FRICTIONAL FORCE

INPUT DEVICE

CROSS REFERENCE TO RELATED APPLICATIONS

The present application is a continuation application of International Patent Application No. PCT/JP2019/016252 filed on Apr. 16, 2019, which designated the U.S. and claims the benefit of priority from Japanese Patent Application No. 2018-094606 filed on May 16, 2018. The entire disclosures of all of the above applications are incorporated herein by reference.

TECHNICAL FIELD

The present disclosure relates to an input device which enables an input operation by an operation body.

BACKGROUND

There has been known an input device that transfers tactile sense to a user.

SUMMARY

An input device includes: a detector configured to detect an operation state of an operation body on an operation surface; a controller configured to execute an input control with respect to a predetermined instrument in accordance with the operation state of the operation body; and a drive portion configured to vibrate the operation surface. A selection position of the operation buttons on a display is correlated to a coordinate position of the operation body on the operation surface. The drive portion generates a predetermined vibration on the operation surface for a predetermined period in response to determining that the selection position of the operation buttons on the display is changed from one operation button to another operation button.

BRIEF DESCRIPTION OF DRAWINGS

Objects, features and advantages of the present disclosure will become apparent from the following detailed description made with reference to the accompanying drawings. In the drawings.

DETAILED DESCRIPTION

There has been known an input device that transfers tactile sense to a user. This kind of input device is arranged at a position different from a display device. The input device includes a touch pad configured to detect an operation position of a finger on an operation surface, an actuator configured to control a frictional force between the finger and the operation surface by vibrating the operation surface based on a detection result of the touch pad, and a controller configured to control an operation of the actuator. The touch pad corresponds to an operation detector, and the actuator corresponds to a vibrating portion. The input device enables an input operation with respect to an icon, such as an operation button, displayed on a display device in response to an operation made on the touch pad by a finger.

On the touch pad, a region corresponding to the icon of the display device is defined as a target region, and a region around the icon is defined as a periphery region. On the operation surface of the touch pad, suppose that a finger moves from a region beyond the periphery region to the periphery region, and then further moves to the target region by passing through the peripheral region. When the finger moves within the periphery region, the controller activates the actuator, and generates a vibration by the actuator.

In a case where the finger moves within the region beyond the periphery region, no vibration is generated and a predetermined frictional force is generated between the finger and the operation surface. In a case where the finger moves within the periphery region, squeeze effect is generated between the finger and the operation surface by the vibration. Thus, a frictional force generated by the finger with respect to the operation surface is decreased. A moving speed of the finger increases with a decrease of the frictional force. In a case where the finger moves within the target region, no vibration is generated and the predetermined frictional force is generated between the finger and the operation surface. When a user moves a finger from the region beyond the periphery region to the periphery region, and then further moves the finger to the target region by passing through the peripheral region, the frictional force is decreased within the periphery region. Thus, the user feels that the finger is retracted by the target region.

For example, in a finger operation, a moving speed and a frictional coefficient of a finger are different for each user. The moving speed and the frictional coefficient of the finger also change according to an environment, such as temperature or humidity, or an operation situation, such as an operation during a driving of a vehicle, an operation in haste, or a familiar operation. The retracted feeling obtained by the vibration and a period the user stops the moving of the finger on the target in response to the retracted feeling are also different for each user. Thus, a stop position of the finger caused by the retracted feeling is likely to be different from an expected position, for example, a central position of the target region. Further, in a case where the user moves the finger again from the stop position to a next target region, an interval to the next retracted feeling sensed by the user may be different, for example, short or long for different users. In a case where the stop position of the finger within the target region is close to a periphery region, a slight movement of the finger causes the finger moves out of the target region, and the vibration is generated. In a case where the finger stops within the periphery region close to the target region, a slight movement of the finger causes the finger moves out of the periphery region, and the vibration is stopped. This kind of unexpected generation or stop of vibration may degrade user experience.

According to an aspect of the present disclosure, an input device includes: a detector configured to detect an operation state of an operation body on an operation surface of the input device, the operation surface receiving an operation carried out by the operation body; a controller configured to execute an input control with respect to a predetermined instrument in accordance with the operation state of the operation body detected by the detector; and a drive portion configured to vibrate the operation surface according to a control by the controller. The predetermined instrument includes a display portion, and the display portion displays multiple operation buttons. A selection position of the operation buttons on the display portion is correlated to a coordinate position of the operation body on the operation surface. The controller controls the drive portion to generate a predetermined vibration on the operation surface for a predetermined period in response to determining that the selection position of the operation buttons on the display portion is changed from one of the operation buttons to another one of the operation buttons by a moving of the operation body on the operation surface.

With above configuration of the present disclosure, a predetermined vibration, which transfers a retraction feeling to the operator, is generated for a predetermined period in response to a movement of the operation body regardless of a position of the operation body on the operation surface. Thus, the retraction feeling can be sensed by the operator in response to the movement of the operation body. This configuration can provide a stable operation feeling to the operator without discomfortable feeling.

According to another aspect of the present disclosure, an input device includes: a touch sensor configured to detect an operation state of an operation body on an operation surface of the input device, the operation surface receiving an operation carried out by the operation body; a controller configured to execute an input control with respect to a predetermined instrument in accordance with the operation state of the operation body detected by the touch sensor; and a vibrator configured to vibrate the operation surface according to a control by the controller. The predetermined instrument includes a display screen that displays a plurality of operation buttons. A selection position of the plurality of operation buttons on the display screen is correlated to a coordinate position of the operation body on the operation surface. The controller controls the vibrator to generate a predetermined vibration on the operation surface for a predetermined period in response to determining that the selection position of the plurality of operation buttons on the display screen is changed from one of the plurality of operation buttons to another one of the plurality of operation buttons by a moving of the operation body on the operation surface.

The following will describe specific embodiments for carrying out the present disclosure with reference to the drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

FIG. 1 to FIG. 4 show an input device 100 according to a first embodiment. The input device 100 of the present embodiment is applied to, for example, a remote operation device for operating a navigation device 50. The input device 100 and the navigation device 50 are mounted in a vehicle 10. The navigation device 50 corresponds to a predetermined instrument in the present disclosure.

Figure 1:
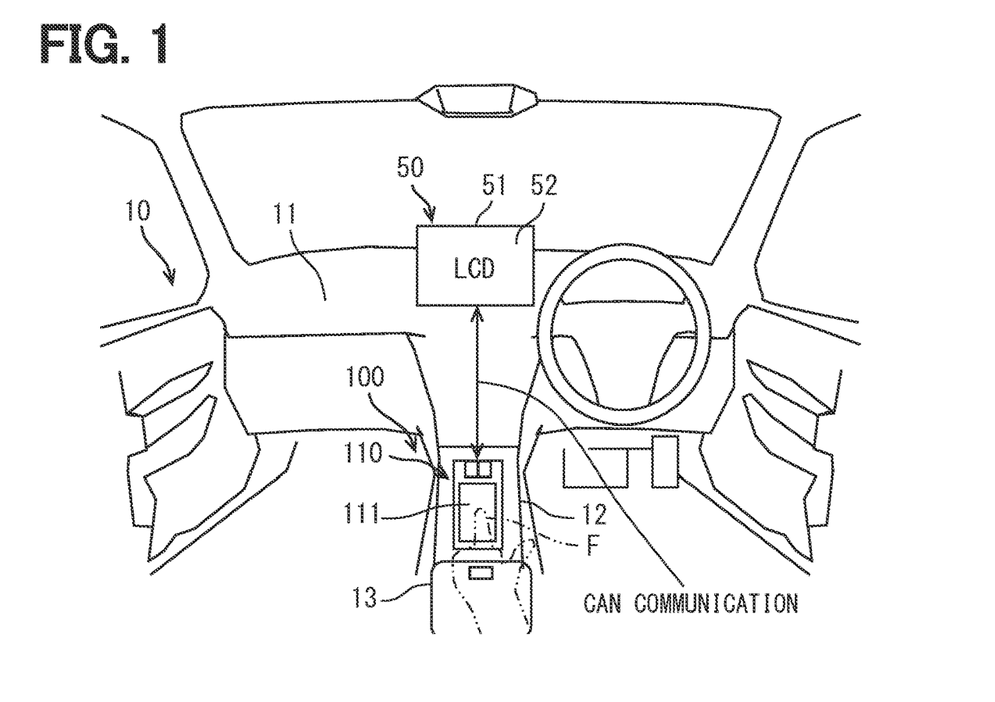
FIG. 1 is a diagram showing a mounting state of an input device in a vehicle.
Figure 2:
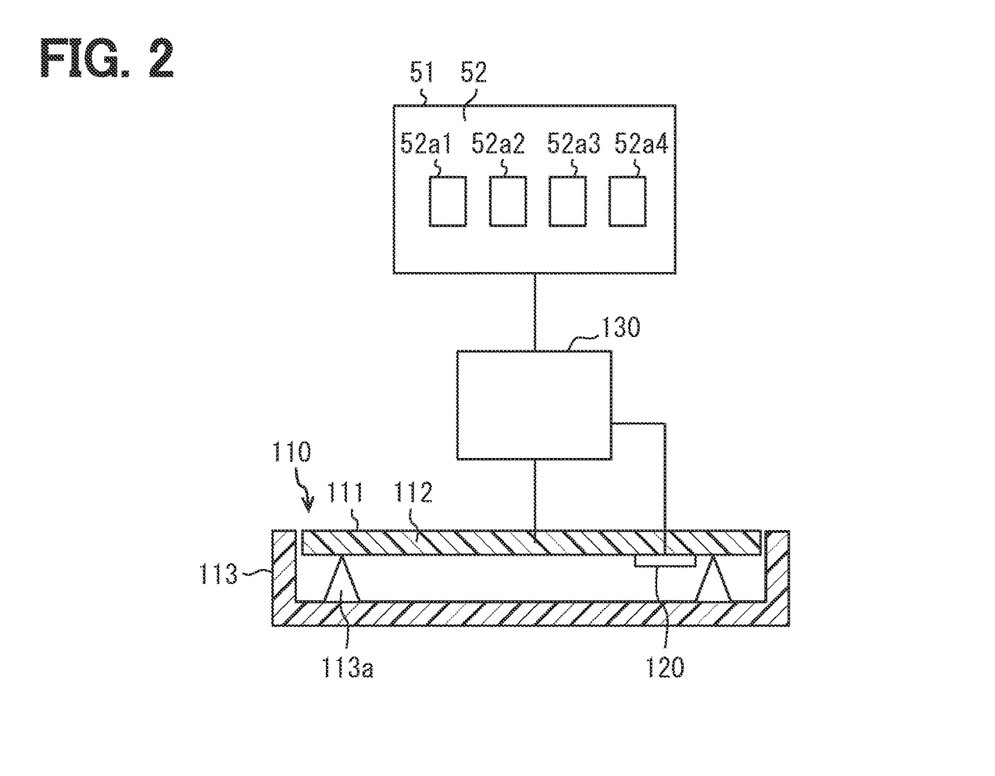
FIG. 2 is a block diagram showing a configuration of the input device.

The navigation device 50 is a route guidance system, and displays current position information of an own vehicle on a map, traveling direction information, or guidance information to a destination designated by an operator, or the like. As shown in FIG. 1 and FIG. 2, the navigation device 50 includes a liquid crystal display 51 as a display portion. The liquid crystal display 51 is placed in a central portion of an instrument panel 11 of the vehicle 10 in a vehicle width direction. The liquid crystal display 51 includes a display screen 52 that is positioned visually recognized by the operator.

The navigation device 50 is provided separately from the input device 100, and is set at a position away from the input device 100. The navigation device 50 and the input device 100 are connected by, for example, a controller area network (CAN) bus. Herein, CAN is a registered trademark. The display screen 52 of the liquid crystal display 51 displays a position of the own vehicle on the map, and displays various operation buttons 52*a*1 to 52*a*4 for operating the navigation device 50. The various operation buttons 52*a*1 to 52*a*4 are may include buttons for an enlarged display, a reduced display, a destination guidance setting, or the like. The various operation buttons 52a1 to 52a4 include a first operation button 52a1, a second operation button 52a2, a third operation button 52a3, and a fourth operation button 52a4. The various operation buttons 52a1 to 52a4 may be also referred to as operation icons.

A change in a coordinate position of the finger F on the operation surface 111 is associated with a selection position of one of the various operation buttons 52a1 to 52a4 displayed on the display screen 52.

The input device 100 is provided at a position adjacent to the armrest 13 on a center console 12 of the vehicle 10, and is positioned within a range that an operator can easily reach. The input device 100 includes an operation portion 110, a drive portion 120, and a controller 130, or the like.

The operation portion 110 forms a well-known touch pad, and serves as a portion for executing the input operation to the navigation device 50 with the finger F of the operator. The operation portion 110 includes the operation surface 111, a touch sensor 112, and a housing 113. The finger F of the operator corresponds to one example of the operation body. In the present disclosure, the finger also includes a thumb.

The operation surface 111 is exposed toward the operator at a position adjacent to the armrest 13, and has a planar shape on which the operator performs a finger operation. For example, a material that improves finger sliding over an entire surface of the operation surface 111 may be placed on the operation surface. On the operation surface 111, input of an operation (selection, pressing decision, or the like) to the various operation buttons 52a1 to 52a4 displayed on the display screen 52 can be performed by the finger operation of the operator.

For example, the touch sensor 112 is a capacitance type sensor placed on a back side of the operation surface 111, and corresponds to a detector in the present disclosure. The touch sensor 112 has a rectangular flat plate shape, and detects an operation state of the finger F of the operator performed on a surface of the touch sensor 112.

The touch sensor 112 includes an electrode arranged extending along an x-axis direction on the operation surface 111 and an electrode arranged extending along a y-axis direction, and the two electrodes are arranged in a grid shape. These electrodes are connected to the controller 130. A capacitance generated by each electrode changes in accordance with an approach of the finger F of the operator toward the surface of the touch sensor. A signal (sensitivity value) of the generated capacitance is output to the controller 130. The surface of the touch sensor is covered with an insulation sheet made of insulation material. The touch sensor 112 is not limited to the capacitance type sensor. Other types, such as a pressure sensitive type sensor can be employed as the touch sensor.

The housing 113 is configured to support the operation surface 111 and the touch sensor 112. The housing 113 has a planner shape, and, for example, is placed inside the center console 12. The housing 113 has multiple support portions 113a positioned on a bottom surface of the housing. The operation surface 111 and the touch sensor 112 are supported by the support portions 113a so that the drive portion 120, which will be described later, can vibrate.

The drive portion 120 is configured to generate an ultrasonic vibration in a direction perpendicular to the operation surface 111. For example, the drive portion 120 is arranged at a predetermined position on a back surface of the touch sensor 112. The drive portion 120 is joined to the touch sensor 112 with, for example, an adhesive, a double-sided tape, a screw, or soldering. The drive portion 120 is electrically connected to the controller 130 by a wiring which will be described later. For example, a flexible wiring may be used as the wiring so that a vibration stress due to the ultrasonic vibration is not applied to other members. The controller 130 controls a vibration generation of the drive portion 120.

For example, a vibrator such as an ultrasonic transducer may be used as the drive portion 120. The ultrasonic transducer is made of a substance having a piezo effect, which changes in volume in response to an applying of a voltage and generates a voltage in response to an applying of a force from outside. For example, the ultrasonic transducer may be provided by a piezoelectric ceramics. The drive portion 120 includes an electrode. In response to an applying of an alternating current voltage, the drive portion 120 vibrates by the piezoelectric effect. A vibration frequency of the drive portion 120 is set to be correlated with a frequency of the applied alternating current voltage.

The controller 130 includes a CPU, a RAM, and a storage medium, or the like. Based on a signal obtained from the touch sensor 112, the controller 130 acquires, as the operation state of the finger F of the operator, a contact position, more specifically, a contact coordinate of the finger F on the operation surface 111, a movement direction, and a movement distance or the like. The controller 130 acquires, as the operation state, a presence or absence of a press operation on any of the buttons on the operation surface 111. The controller 130 controls a vibration generation state of the drive portion 120 according to the operation state, and the drive portion 120 generates a predetermined vibration on the operation surface 111 to execute the retraction control with respect to the finger F.

Figure 3A:
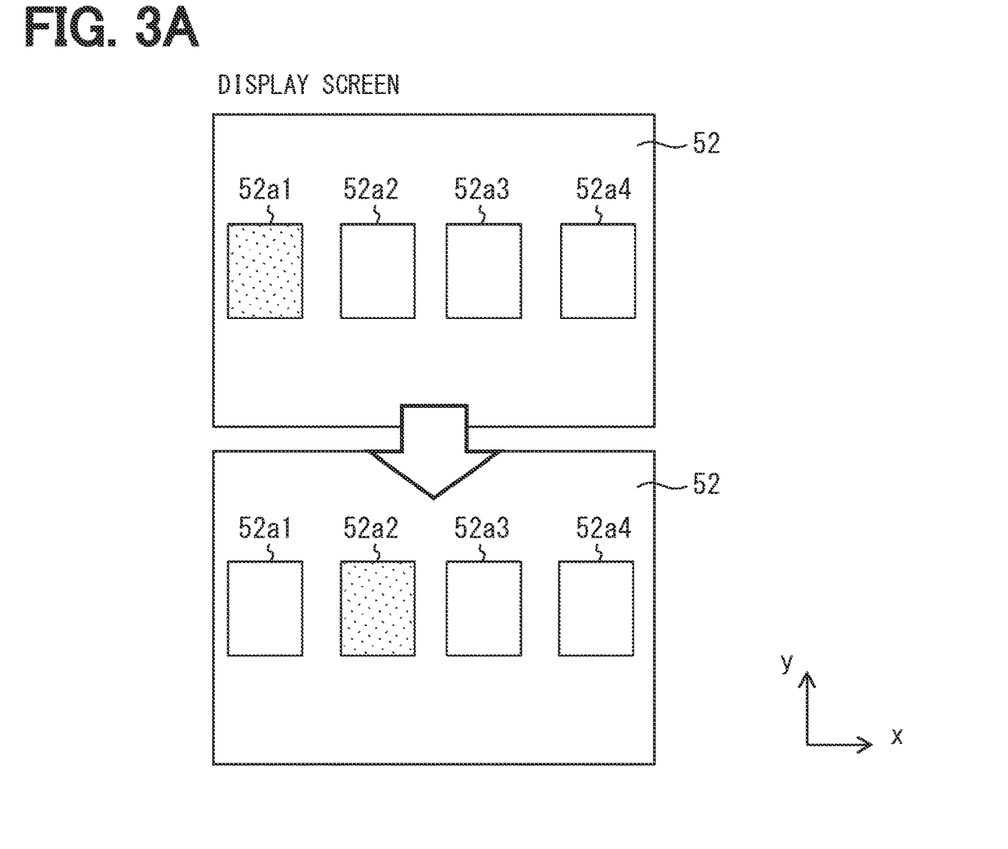
FIG. 3A is a diagram showing operation buttons and a movement state of a finger.
Figure 3B:
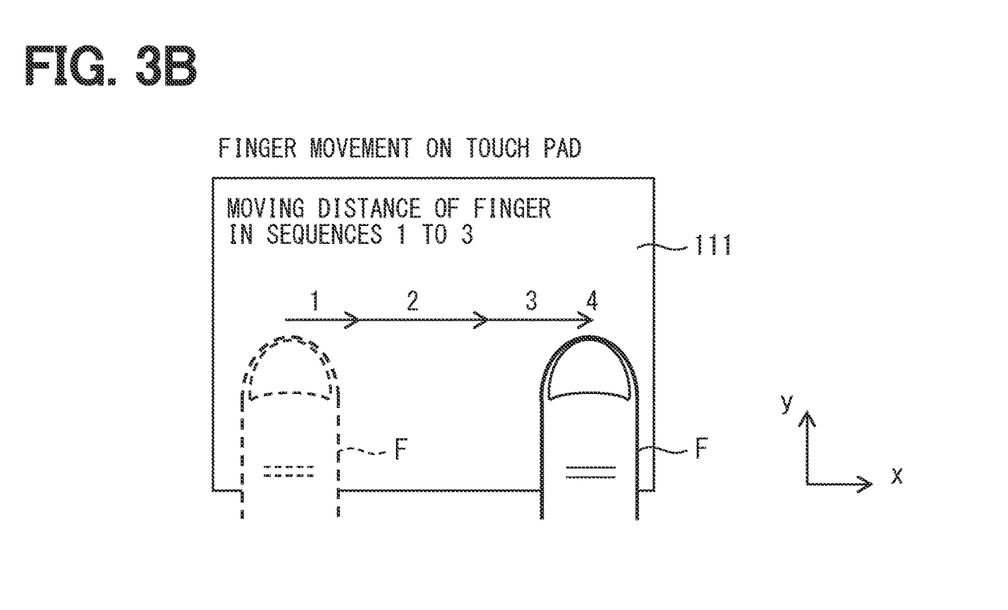
FIG. 3B is a diagram showing an operation button and a movement state of a finger.
Figure 4:
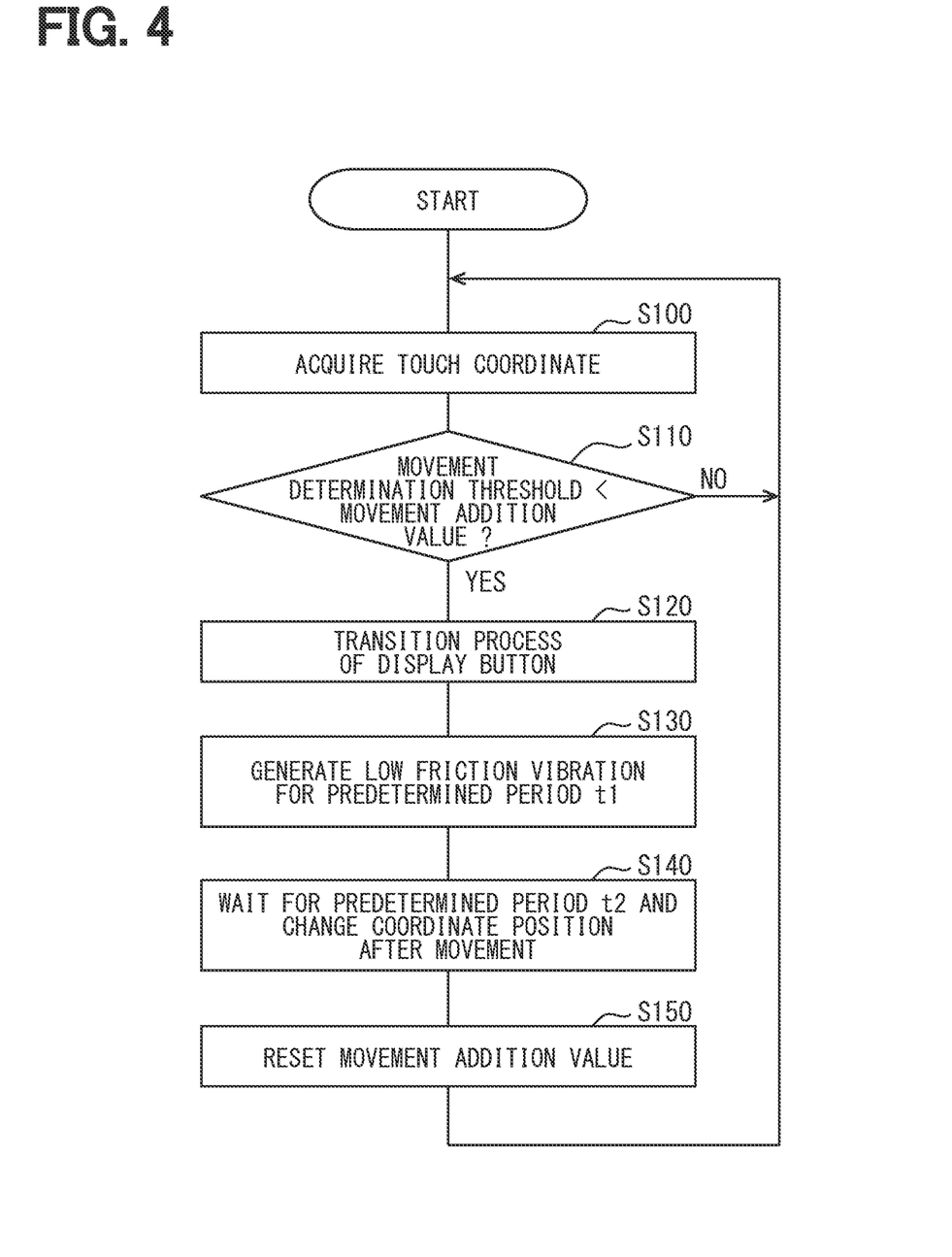
FIG. 4 is a flowchart showing a control process.

The following will describe an operation of the input device 100 with reference to FIG. 3A, FIG. 3B, and FIG. 4. For example, as shown in FIG. 3A and FIG. 3B, a selection state of the operation buttons 52a1 to 52a4 changes from a selection state of one operation button, for example, the first operation button 52a1 to a selection state of a different operation button, for example, the second operation button 52a2 by a finger operation, for example, moving of the finger. In this case, the retraction control is executed.

As shown in a flowchart of FIG. 4, the controller 130 acquires, at S100, a touch position of the finger F on the operation surface 111. Herein, the touch position is a coordinate position. When the finger F touches a position corresponding to the first operation button 52a1 on the operation surface 111, a thickness of an outer peripheral of the first operation button 52a1 may be increased or a color of the first operation button 52a1 may be changed in order to highlight the first operation button 52a1 on the display screen 52.

At S110, the controller 130 determines whether a movement addition value of the finger exceeds a predetermined movement determination threshold in order to detect a movement of the finger F. At S110, in response to the movement addition value exceeding the movement determination threshold, the controller 130 determines that the movement of the finger F for an operation is generated. Then, the controller 130 proceeds to S120. In S110, in response to NO determination, the controller 130 returns to S100.

At S120, the controller 130 executes a transition process to the display button corresponding to "1" shown in FIG. 3B. Specifically, the controller 130 changes a highlighted display of the selected first operation button 52a1 to the second operation button 52a2. In this case, the second operation button 52a2 is arranged at a position where the finger F moves toward.

At S130, the controller 130 executes a generation process of a low friction vibration corresponding to "2" shown in FIG. 3B. Specifically, the controller 130 controls the drive portion 120 to vibrate for a predetermined period t1 so that an ultrasonic vibration is generated on the operation surface 111 as a predetermined vibration. The predetermined period t1 is set in advance such that a retraction feeling can be reliably sensed by the operator.

The controller 130 controls the drive portion 120 to vibrate, and an air layer is generated between the operation surface 111 and the finger F by the ultrasonic vibration. Thus, a frictional force Fr between the operation surface 111 and the finger F is decreased by the squeeze effect. The operator senses a retraction feeling on the finger F toward the second operation button 52a2.

In response to an elapse of the predetermined period t1, the controller 130 cancels the low friction vibration corresponding to "3" in FIG. 3B by deactivating the drive portion 120 at S140. Thus, operation surface 11 changes from a low friction state to a high friction state. After the elapse of the predetermined period t1, the controller 130 sets a predetermined wait period t2. The predetermined period t2 is set in advance such that the finger F is able to stably stop movement within the predetermined period t2. Then, the controller 130 changes the coordinate position corresponding to "4" in FIG. 3B. Specifically, the controller 130 changes the coordinate position of the finger F on the operation surface 111 from the first operation button 52a1 to the second operation button 52a2. Alternatively, the controller 130 may change the coordinate position of the finger F on the operation surface 111 from the first operation button 52a1 to a center position of the second operation button 52a2.

At S150, the controller 130 resets the movement addition value calculated at S110, and returns to S100.

As described above, in the present embodiment, in response to the movement of the finger F, the ultrasonic vibration is generated as the predetermined vibration for the predetermined period t1 to execute the retraction control regardless of the position of the finger F on the operation surface 111. The retraction feeling is sensed by the operator in response to the movement of the finger F. Thus, the operator can sense stable operation feeling without discomfortable feeling.

After elapse of the predetermined period t1, the ultrasonic vibration is stopped and wait state is maintained for the predetermined period t2. Then, the coordinate position of the finger is changed on the operation surface 111. Thus, a passing through of the target operation button, the second operation button 52a2 in the present embodiment, can be avoided.

Modification of First Embodiment

In the flowchart of FIG. 4, S120 may be executed in any order under a condition of between S110 and S150.

After elapse of the predetermined period t1, the controller 130 may generate a vibration different from the predetermined vibration, the ultrasonic vibration in the above embodiment so that the operator can sense a click feeling on the finger F. With this configuration, the operator can clearly recognize, by the click feeling, the finger F is retracted from one operation button, for example, the first operation button 52a1 to another operation button, for example, the second operation button 52a2.

After elapse of the predetermined period t1, the controller 130 may determine the coordinate position of the finger F on the operation surface 111 corresponding to another operation button after movement, for example, the second operation button 52a2 according to a pressing force of the finger F with respect to the operation surface 111. For example, in a case where the pressing force is equal to or less than a predetermined force, the coordinate position of the finger F may be newly determined. For another example, in a case where the pressing force is equal to or greater than a predetermined force, the coordinate position of the finger F may be newly determined. With this configuration, the coordinate position can be determined more accurately.

Figure 5A:
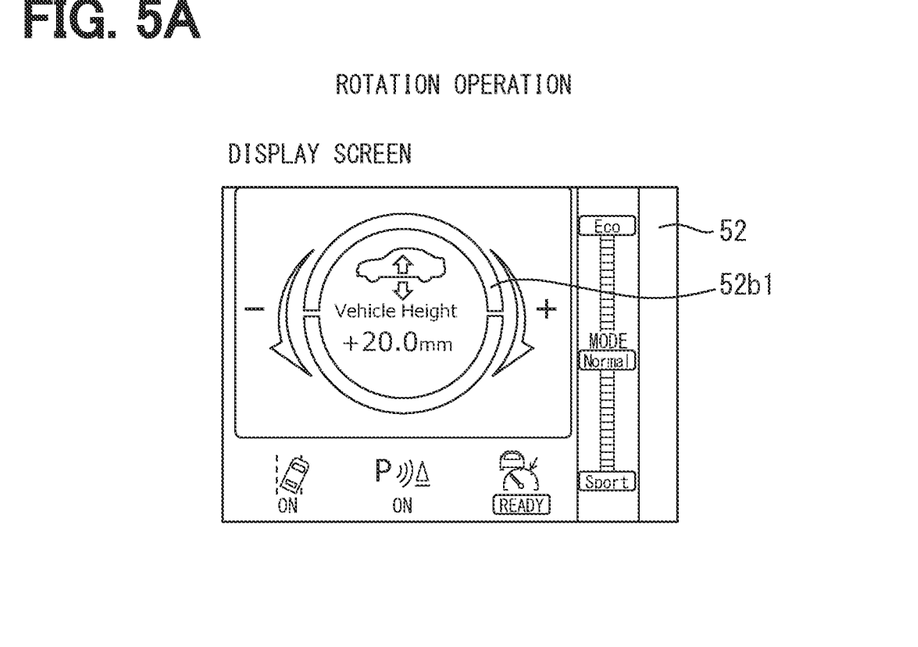
FIG. 5A is a diagram showing a rotation operation made by a finger.
Figure 5B:
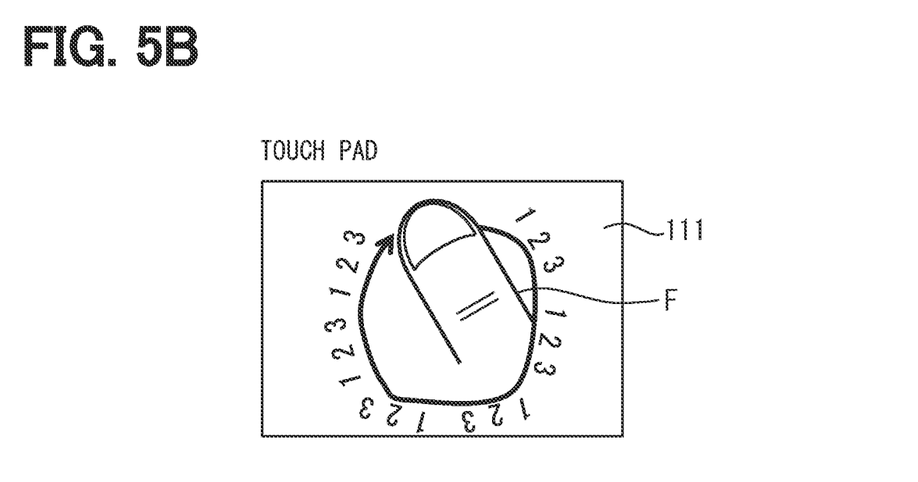
FIG. 5B is a diagram showing a rotation operation made by a finger.
Figure 6A:
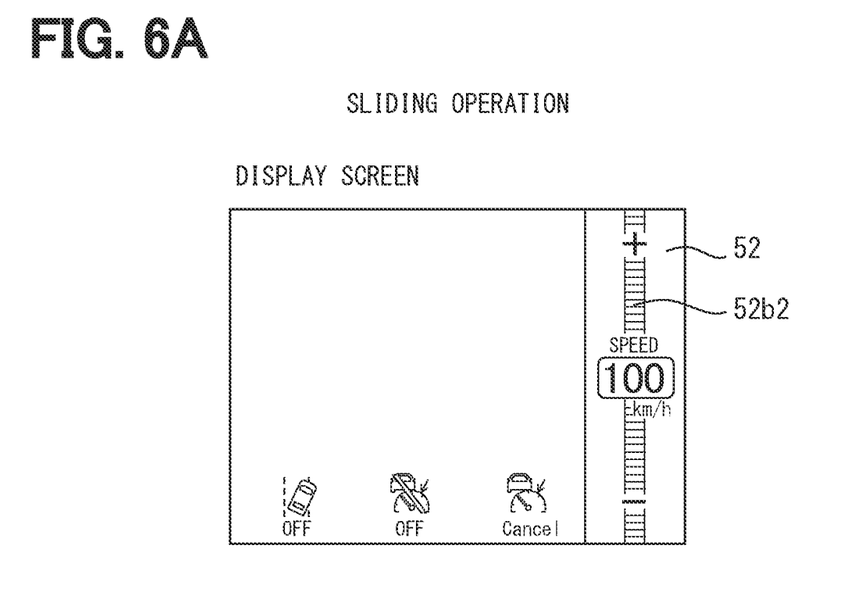
FIG. 6A is a diagram showing a sliding operation made by a finger.
Figure 6B:
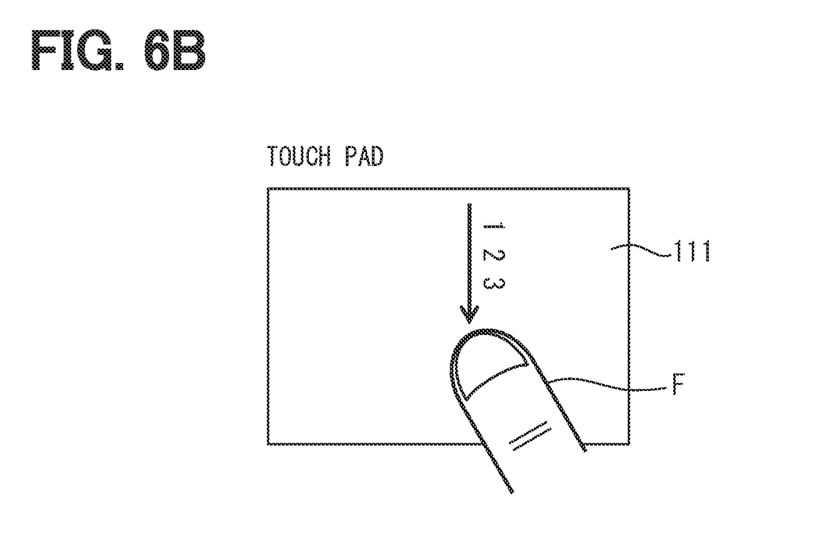
FIG. 6B is a diagram showing a sliding operation made by a finger.

Above-described embodiment can also be applied to an operation switch 52b1 (vehicle height adjusting switch) on the display screen 52 as shown in FIG. 5A and FIG. 5B. A rotation operation is applied to the operation switch 52b1 to adjust a height of the vehicle. Above-described embodiment can also be applied to an operation switch 52b2 (vehicle speed adjusting switch) on the display screen as shown in FIG. 6A and FIG. 6B. A sliding operation is applied to the operation switch 52b2 to adjust a speed of the vehicle. In a case of the rotation operation or a sliding operation, the processes corresponding to "1", "2", and "3" shown in FIG. 3B may be executed. More specifically, the process corresponding to S120, S130, and S140 in FIG. 4 may be executed repeatedly. With this configuration, in a control of an adjustment amount, for example, a vehicle height or a vehicle speed, a reliable sensing can be transferred to the operator, and the operator is able to perform a stable operation.

Second Embodiment

A second embodiment of the present disclosure will be described with reference to FIG. 7A to FIG. 12B. A configuration of the input device 100 according to the second embodiment is similar to that of the first embodiment. The control process of the input device 100 according to the second embodiment is different from that of the first embodiment. In the present embodiment, the predetermined period t1, the predetermined period t2, and the movement determination threshold are set according to a moving speed of the finger F.

Figure 7A:
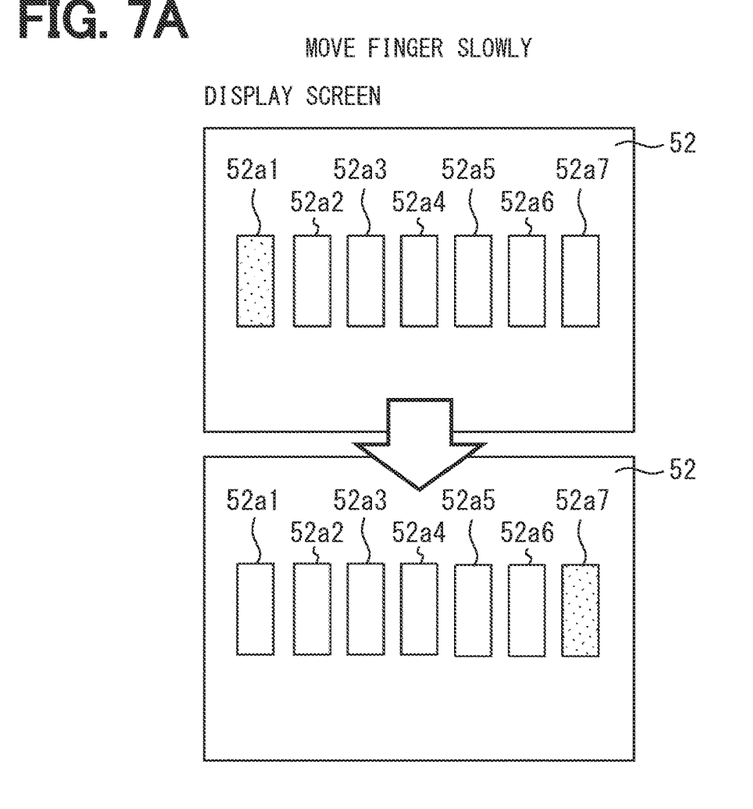
FIG. 7A is a diagram showing operation buttons and a movement state (a slow moving case) of a finger.
Figure 7B:
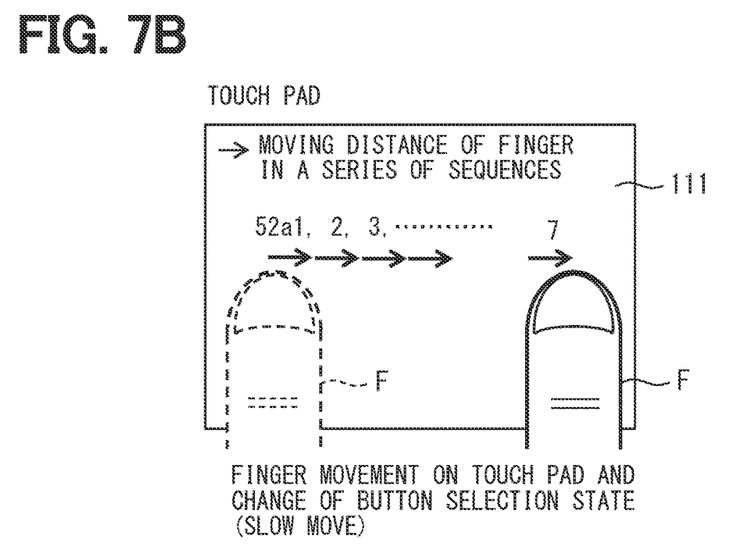
FIG. 7B is a diagram showing operation buttons and a movement state (a slow moving case) of a finger.
Figure 8A:
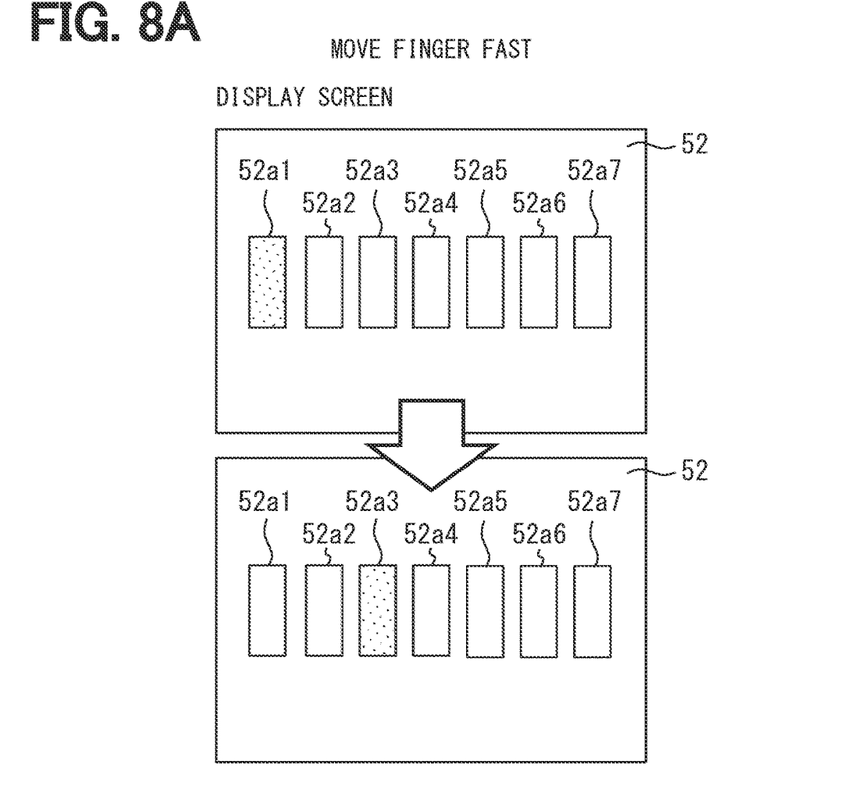
FIG. 8A is a diagram showing operation buttons and a movement state (a fast moving case) of a finger.
Figure 8B:
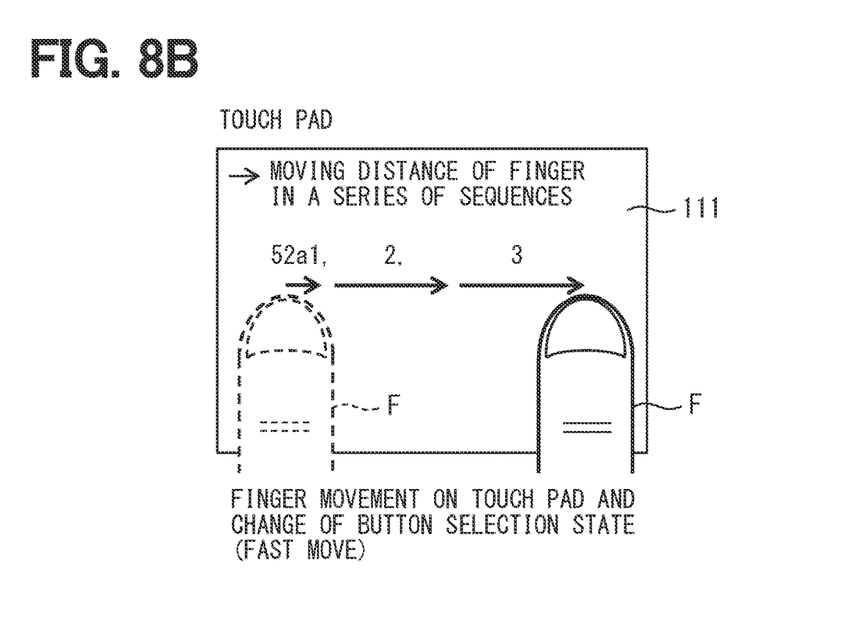
FIG. 8B is a diagram showing operation buttons and a movement state (a fast moving case) of a finger.

On the display screen, suppose that a fifth operation button 52a5, a sixth operation button 52a6, and a seventh operation button 52a7 are displayed in addition to the first to fourth operation buttons 52a1 to 52a4 along a line. In a case where the finger F moves at a relatively low speed, as shown in FIG. 7A and FIG. 7B, a distance between two adjacent operation buttons is relatively short, and the number of the operation buttons to which the finger F is able to move is relatively large. In a case where the finger F moves at a relatively high speed, as shown in FIG. 8A and FIG. 8B, under the same moving distance, the finger F moves from one end of the operation surface 111 to the other end of the operation surface 111 using a short time. Thus, the number of the operation buttons to which the finger F is able to move is relatively small. This relationship is also applied to the rotation operation described with reference to FIG. 5A and FIG. 5B, and the sliding operation described with reference to FIG. 6A and FIG. 6B. In a case where the finger operation is carried out at a high speed, the number of operation buttons under the same movement distance is decreased and the operation amount is also decreased in reverse proportion to the moving speed, which is insensitive.

In the present embodiment, the predetermined period t1 is determined according to the moving speed of the finger F with consideration of the above-described relationship. The predetermined period t2 and the movement determination threshold for determining a movement of the finger F may also be set according to the moving speed of the finger F.

Figure 9:
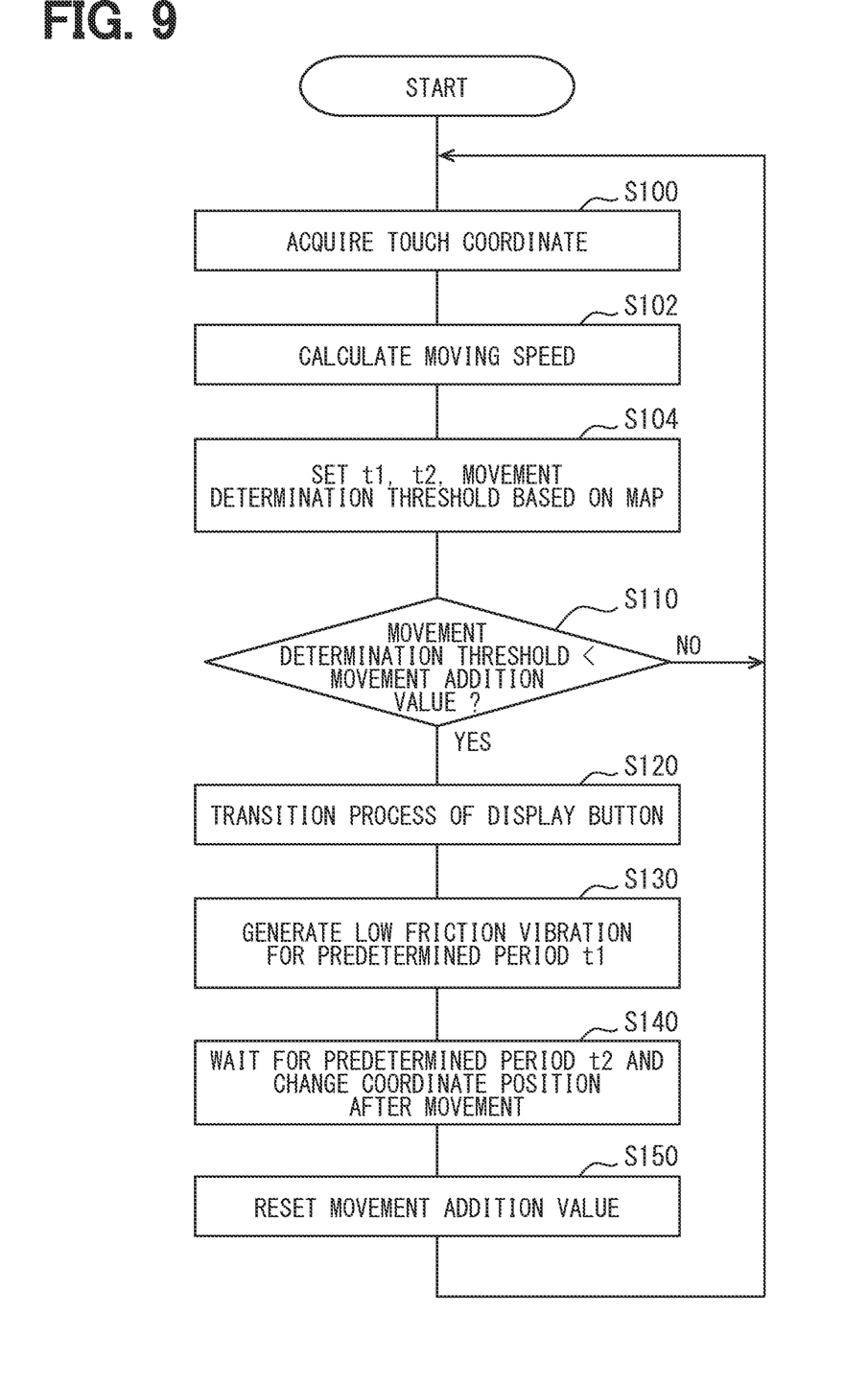
FIG. 9 is a flowchart showing a control process.

FIG. 9 shows a retraction control executed by the controller 130. Compared with the retraction control of the first embodiment shown in FIGS. 4, S102 and S104 are added between S100 and S110.

In the flowchart shown in FIG. 9, the controller 130 acquires the touch position (coordinate position) of the finger F on the operation surface 111 at S100, and calculates a moving speed of the finger F at S102. The controller 130 calculates the moving speed of the finger F by dividing a moving amount by a moving period before a movement distance of the finger F increases to the movement determination threshold.

Figure 10A:
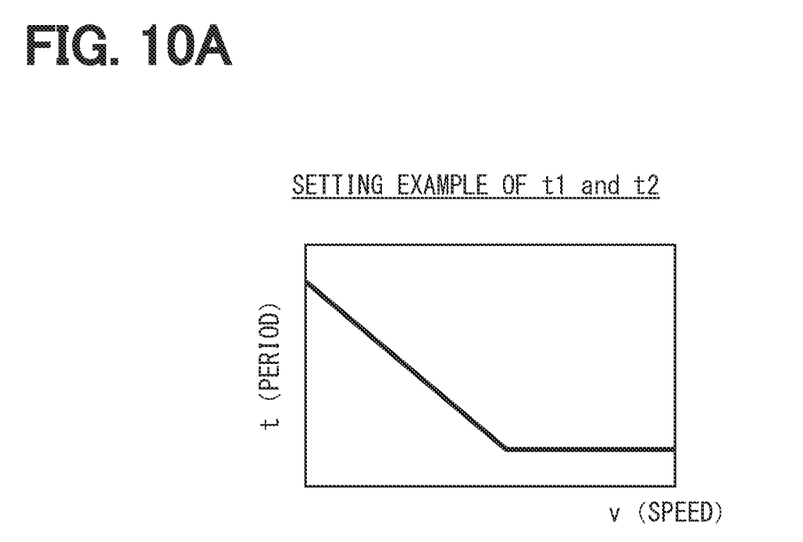
FIG. 10A is a graph (first part) showing a relationship between a predetermined duration corresponding to a moving speed of a finger and a movement determination threshold.
Figure 10B:
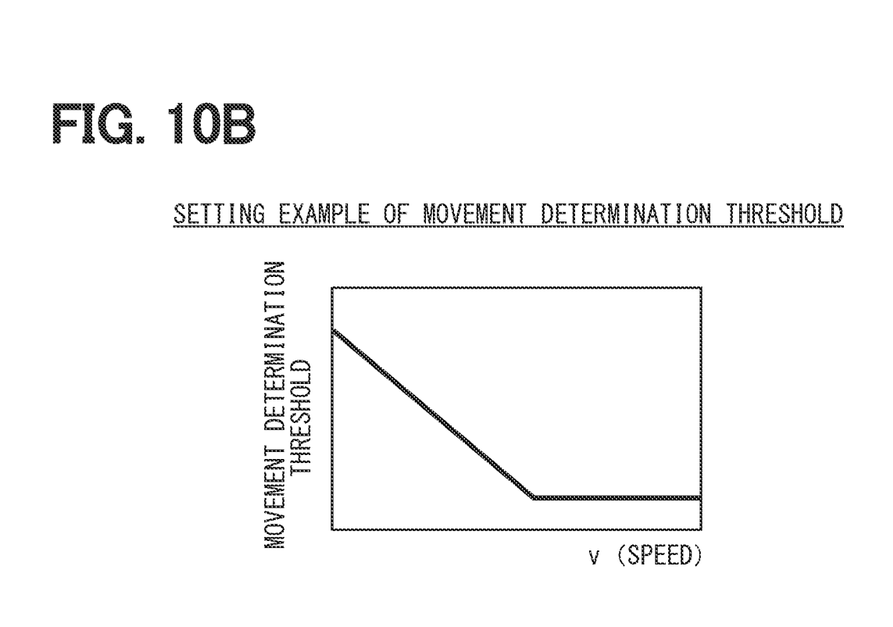
FIG. 10B is a graph (first part) showing a relationship between a predetermined duration corresponding to a moving speed of a finger and a movement determination threshold.
Figure 11A:
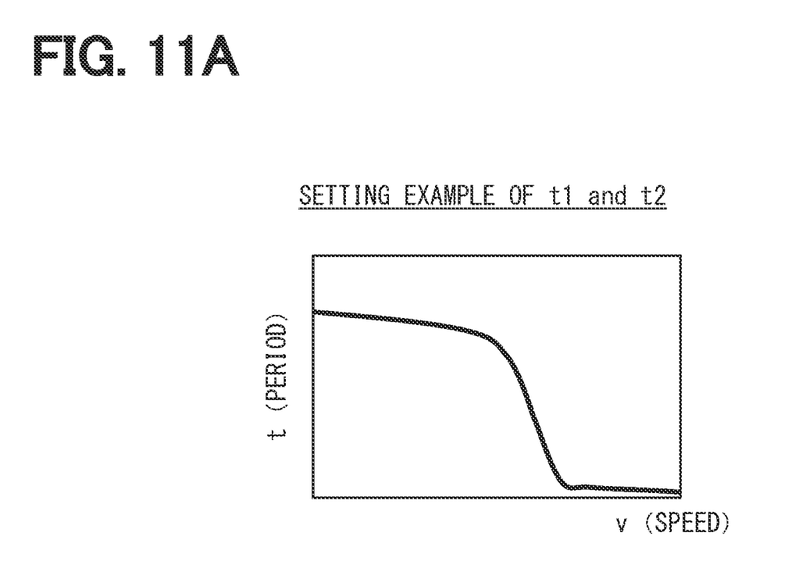
FIG. 11A is a graph (second part) showing a relationship between a predetermined duration corresponding to a moving speed of a finger and a movement determination threshold.
Figure 11B:
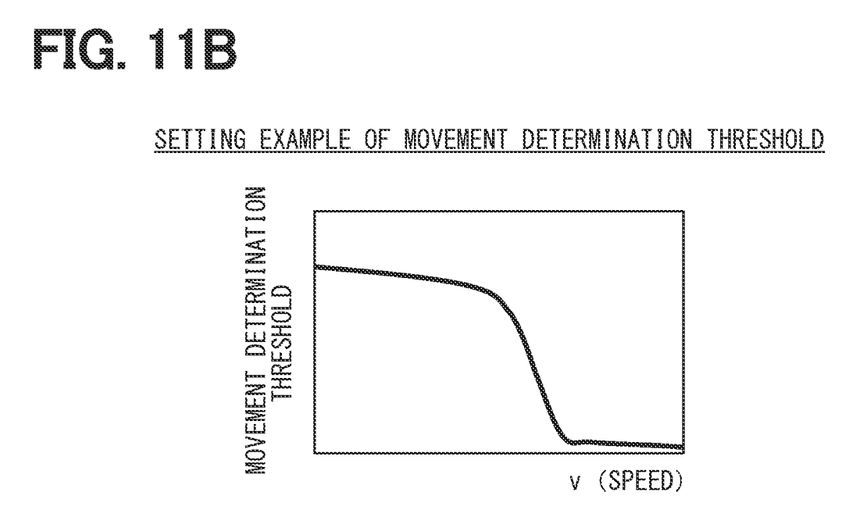
FIG. 11B is a graph (second part) showing a relationship between a predetermined duration corresponding to a moving speed of a finger and a movement determination threshold.
Figure 12A:
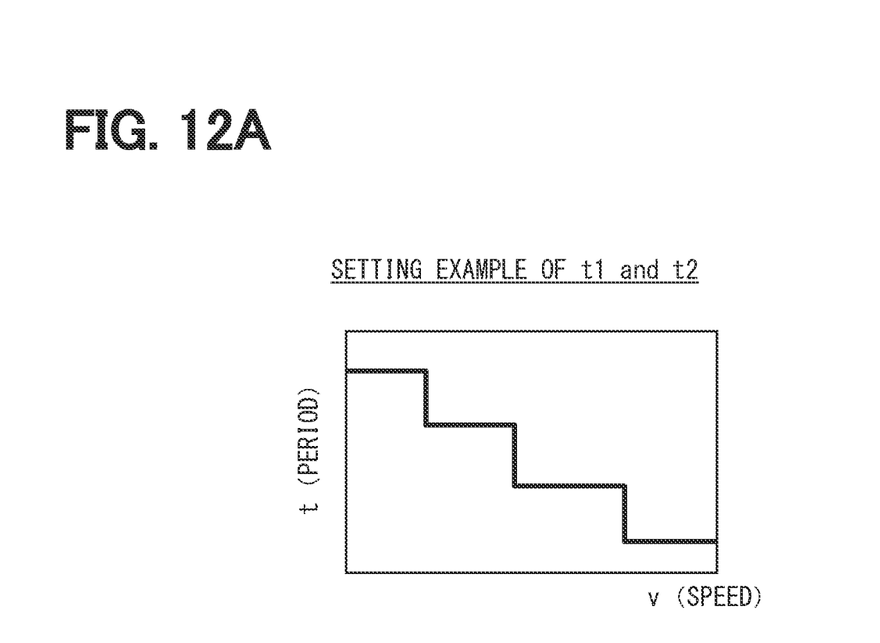
FIG. 12A is a graph (third part) showing a relationship between a predetermined duration corresponding to a moving speed of a finger and a movement determination threshold.
Figure 12B:
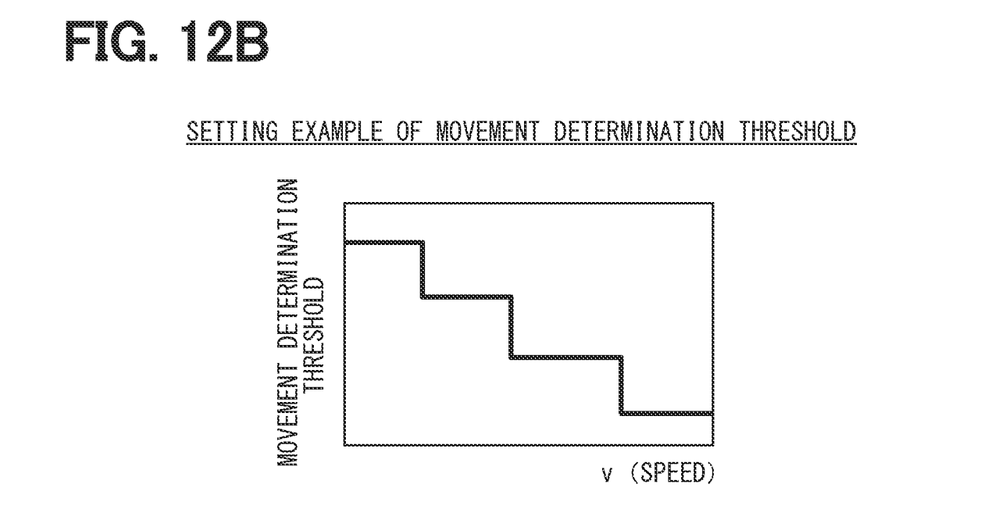
FIG. 12B is a graph (third part) showing a relationship between a predetermined duration corresponding to a moving speed of a finger and a movement determination threshold.

At S104, the controller 130 sets the predetermined period t1, the predetermined period t2, and the movement determination threshold according to a preliminarily stored map. As shown in FIG. 10A and FIG. 10B, the map may be set as a relationship between the moving speed of the finger F and the predetermined period t1, predetermined period t2, and the movement determination threshold. Each of the predetermined period t1, predetermined period t2, and the movement determination threshold may be set to linearly decrease (inversely proportional to) with an increase of the moving speed of the finger F.

After S104, the controller 130 executes S110 to S150. With this configuration, the predetermined period t1 (the predetermined period t2, the movement determination threshold) is inversely proportional to the moving speed of the finger F. In response to an increase of the moving speed of the finger F, the predetermined period t1 (the predetermined period t2, the movement determination threshold) is set in decreased manner. Thus, in a case where the finger F moves on the operation surface 111 within the same area, the number of the operation buttons (52a1 to 52a7) the finger F sequentially passes through does not change with a change of the moving speed of the finger F.

The map which defines a relationship between the moving speed of the finger and the predetermined period t1, the predetermined period t2, and the movement determination threshold each may also be set as shown in FIG. 11A, FIG. 11B, FIG. 12A and FIG. 12B. In the map shown in FIG. 11A and FIG. 11B, the predetermined period t1, the predetermined period t2, and the movement determination threshold are set with consideration of a non-linear characteristic of human beings. In the map shown in FIG. 12A and FIG. 12B, the predetermined period t1, the predetermined period t2, and the movement determination threshold are set in stepwise manner with a change of the moving speed of the finger F. This setting of the predetermined period t1, the predetermined period t2, and the movement determination threshold can clearly indicate a difference of the control effect to the operator, and can decrease a calculation processing load of the controller 130.

First Modification of Second Embodiment

Figure 13A:
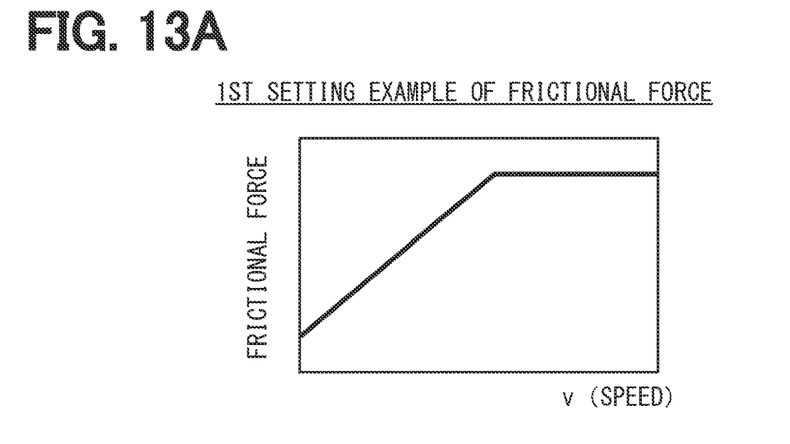
FIG. 13A is a graph showing a relationship between a moving speed of a finger and a frictional force.
Figure 13B:
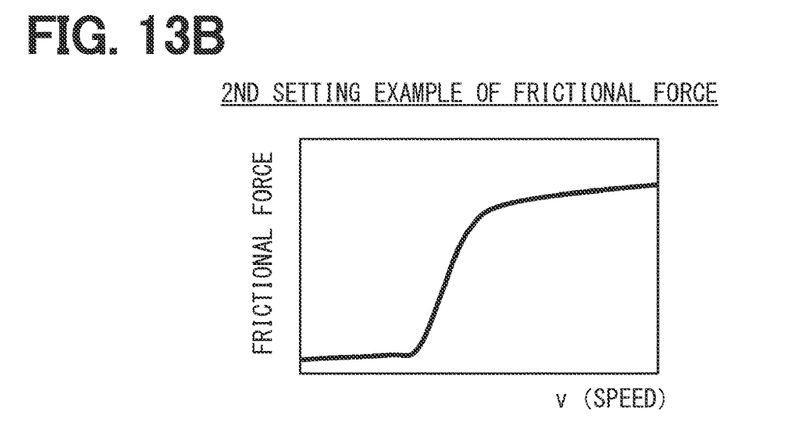
FIG. 13B is a graph showing a relationship between a moving speed of a finger and a frictional force.
Figure 13C:
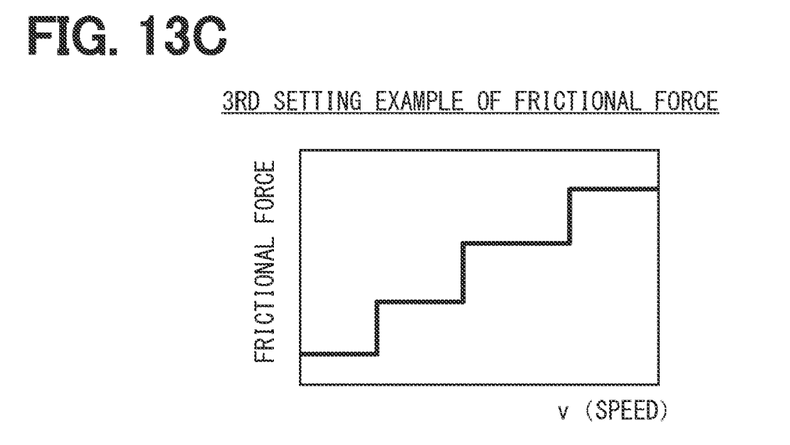
FIG. 13C is a graph showing a relationship between a moving speed of a finger and a frictional force.

In the above second embodiment, instead of the map for setting the predetermined period t1, a map for setting a frictional force Fr generated between the operation surface 111 and the finger F in relation to the moving speed of the finger F may be used as shown in FIG. 13A to FIG. 13C. In the map shown in FIG. 13A, the frictional force linearly increases with an increase of the moving speed of the finger F. In order to increase the frictional force Fr provided by the squeeze effect of the ultrasonic vibration, a vibration amplitude needs to be decreased. In contrast, in order to decrease the frictional force Fr provided by the squeeze effect of the ultrasonic vibration, the vibration amplitude needs to be increased.

In a setting of the map related to the frictional force Fr, a non-linear setting as shown in FIG. 13B or a stepwise manner setting as shown in FIG. 13C may be adopted.

Second Modification of Second Embodiment

In the second embodiment, a size of each operation button 52a1 to 52a7 may be changed according to the moving speed of the finger F. For example, the controller 130 may decrease a size of each operation button 52a1 to 52a7 with an increase of the moving speed of the finger F. With this configuration, the operator can visually recognize a moving speed of the finger F.

Other Embodiments

In each of the foregoing embodiments, the ultrasonic vibration is generated in a perpendicular direction to the operation surface 111, and the retraction control is carried out by the squeeze effect. Alternatively, a vibration may be generated in a direction along which the operation surface 111 extends. Specifically, the vibration may be generated in a reciprocated manner along a moving direction of the finger F on the operation surface 111. A speed or an acceleration of the vibration may be set greater in a moving direction of the finger F, and the speed or the acceleration of the vibration may be set smaller in a direction opposite to the moving direction of the finger F. In the direction opposite to the moving direction of the finger F, the frictional force Fr between the finger F and the operation surface 111 is small. Thus, the finger stops at the position without movement. In the moving direction of the finger, the frictional force Fr between the finger F and the operation surface is great. Thus, the finger F moves together with the operation surface 111, and with repeating of this movement, the finger F is retracted in the moving direction.

In each of the foregoing embodiments, the operation portion 110 is described as a touch pad. Alternatively, the present disclosure may be applied to a touch panel in which the display screen 52 of the liquid crystal display 51 is visually recognized through the transparent operation surface 111.

In each of the above embodiments, it is described that the operation object is the finger F of the operator. Alternatively, a pen-like stick for inputting an operation may function as the operation object.

In each of the foregoing embodiments, an input control target (predetermined instrument) of the input device 100 is described as the navigation device 50. Alternatively, the input device may be applied to a different instrument such as an air conditioner of a vehicle or to an audio device of a vehicle.

The control and the method therefor which have been described in the present disclosure may be implemented by a special purpose computer which includes a processor programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

It is noted that a flowchart or the process of the flowchart in the present disclosure includes multiple steps (also referred to as sections), each of which is represented, for instance, as S100. Further, each step can be divided into several sub-steps while several steps can be combined into a single step.

In the above, the embodiments, the configurations, the aspects of the input device according to the present disclosure are exemplified. The present disclosure is not limited to the above-described embodiments, each configuration and each aspect related to the present disclosure. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An input device comprising:
a detector configured to detect an operation state of an operation body on an operation surface of the input device, the operation surface receiving an operation carried out by the operation body;
a controller configured to execute an input control with respect to a predetermined instrument in accordance with the operation state of the operation body detected by the detector; and
a drive portion configured to vibrate the operation surface according to a control by the controller,
wherein:
the predetermined instrument includes a display portion that displays a plurality of operation buttons;
a selection position of the plurality of operation buttons on the display portion is correlated to a coordinate position of the operation body on the operation surface;
the controller (i) controls the drive portion to generate a predetermined vibration on the operation surface for a first predetermined period, and then (ii) cancels the predetermined vibration and waits for a second predetermined period in response to determining that the selection position of the plurality of operation buttons on the display portion is changed from one of the plurality of operation buttons to another one of the plurality of operation buttons by a moving of the operation body on the operation surface; and
after an elapse of the first predetermined period and the second predetermined period, the controller changes the coordinate position of the operation body on the operation surface from the one of the plurality of operation buttons to another one of the plurality of operation buttons.

2. The input device according to claim 1, wherein the controller controls the drive portion to generate a different vibration which is different from the predetermined vibration toward the operation body after an elapse of the first predetermined period.

3. The input device according to claim 1, wherein, after an elapse of the first predetermined period, the controller determines a coordinate position of the operation body on the operation surface corresponding to another one of the plurality of operation buttons after movement based on a pressing force of the operation body with respect to the operation surface.

4. The input device according to claim 1, wherein the controller decreases the first predetermined period with an increase of a moving speed of the operation body.

5. The input device according to claim 1, wherein the controller decreases a movement determination threshold which is referred to determine a movement of the operation body with an increase of a moving speed of the operation body on the operation surface.

6. The input device according to claim 1, wherein the controller decreases an amplitude of the predetermined vibration with an increase of a moving speed of the operation body on the operation surface.

7. The input device according to claim 1, wherein the controller decreases a size of each of the plurality of operation buttons with an increase of a moving speed of the operation body on the operation surface.

8. An input device comprising:
a touch sensor configured to detect an operation state of an operation body on an operation surface of the input device, the operation surface receiving an operation carried out by the operation body;
a controller configured to execute an input control with respect to a predetermined instrument in accordance with the operation state of the operation body detected by the touch sensor; and
a vibrator configured to vibrate the operation surface according to a control by the controller,
wherein:
the predetermined instrument includes a display screen that displays a plurality of operation buttons;
a selection position of the plurality of operation buttons on the display screen is correlated to a coordinate position of the operation body on the operation surface;
the controller (i) controls the vibrator to generate a predetermined vibration on the operation surface for a first predetermined period, and then (ii) cancels the predetermined vibration and waits for a second predetermined period in response to determining that the selection position of the plurality of operation buttons on the display screen is changed from one of the plurality of operation buttons to another one of the plurality of operation buttons by a moving of the operation body on the operation surface; and
after an elapse of the first predetermined period and the second predetermined period, the controller changes the coordinate position of the operation body of the operation surface from the one of the plurality of operation buttons to another one of the plurality of operation buttons.

* * * * *